(No Model.)

C. W. HAZELTINE.
PUNCTURE PROOF COVERING FOR PNEUMATIC TIRES.

No. 560,408. Patented May 19, 1896.

Witnesses
W. C. Alexander.
E. E. Vernell.

Inventor
Chas. W. Hazeltine
By Attorneys
Fowler & Fowler

UNITED STATES PATENT OFFICE.

CHARLES WALTER HAZELTINE, OF ST. LOUIS, MISSOURI.

PUNCTURE-PROOF COVERING FOR PNEUMATIC TIRES.

SPECIFICATION forming part of Letters Patent No. 560,408, dated May 19, 1896.

Application filed October 19, 1895. Serial No. 566,213. (No model.)

*To all whom it may concern:*

Be it known that I, CHARLES WALTER HAZELTINE, a citizen of the United States, residing at the city of St. Louis, in the State of Missouri, have invented a certain new and useful Puncture-Proof Covering for Pneumatic Tires, of which the following is such a full, clear, and exact description as will enable any one skilled in the art to which it appertains to make and use the same, reference being had to the accompanying drawings, forming part of this specification.

The object of my invention is to provide a puncture-proof covering for pneumatic tires which will not interfere with the resiliency or rebound of the pneumatic tire and its running qualities, and which will not be bulky or add materially to the weight of the tire.

It has heretofore been proposed to provide puncture-proof coverings for pneumatic tires consisting of woven and unwoven fibrous material placed in the tread of the tire. I have found that such protective coverings either interfere with the running qualities of the wheel or are bulky and add materially to the weight of the tire. Such puncture-proof covering is taut all around the circumference when the tire is inflated and not in use. When, however, the tire is in use, the weight sustained by the tire causes the part making contact with the ground to be flattened, and this makes the puncture-proof covering bulge or buckle, destroying the circumferential smoothness of said covering. This causes a raised loose place in the puncture-proof covering at the front of the wheel in contact with the ground and makes a lumpy place in the tire over which the rider is continually riding. This interferes with the running qualities of the wheel, inasmuch as the part of the tire in contact with the ground does not present a smooth unbroken surface.

My invention in carrying out this object consists in furnishing a pneumatic tire with a puncture-proof covering having inserted transversely across the same elastic material, so that such elastic material will take up the circumferential slack in the puncture-proof covering when in use, whereby a smooth running-surface is presented to the ground and the running qualities of the wheel are the same as with the ordinary rubber pneumatic tire.

Figure 1:
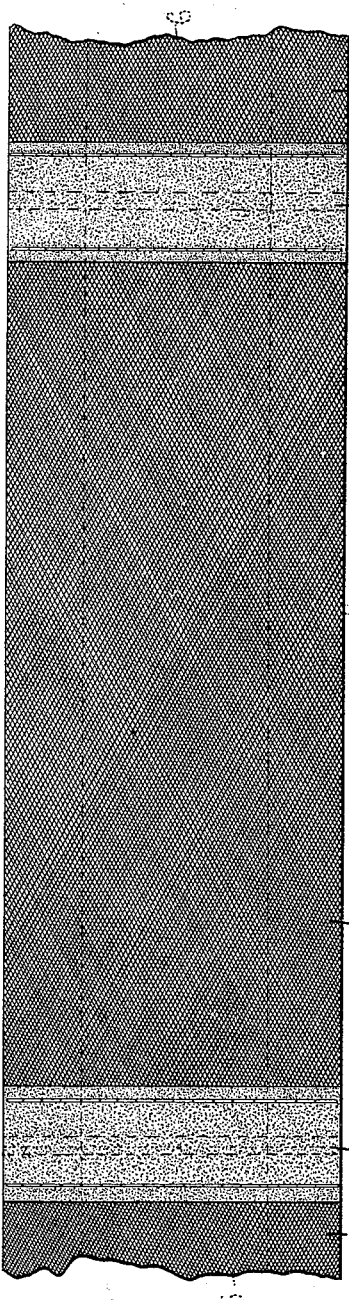
Figure 2:
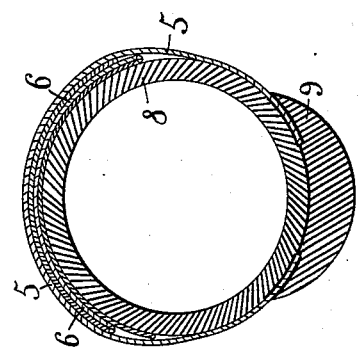
Figure 3:
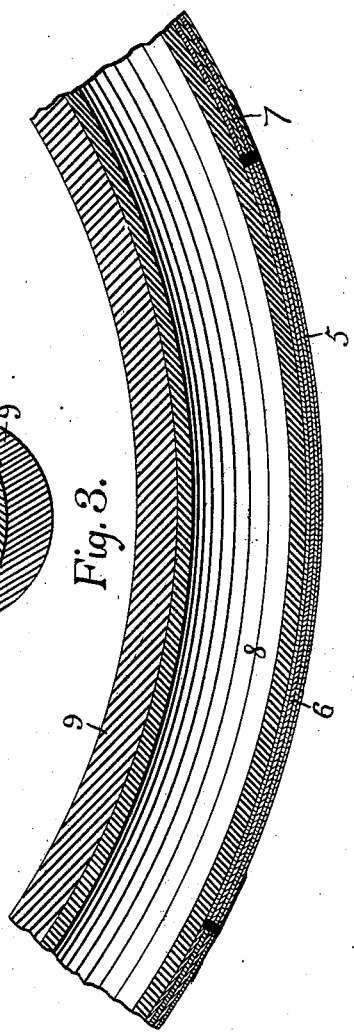

Figure 1 is a view of a portion of a puncture-proof covering for pneumatic tires made in accordance with one form of my invention, the same being developed or rolled out flat. Fig. 2 is a cross-section of a pneumatic tire provided with a puncture-proof covering and showing how the puncture-proof covering is attached to the rim of the wheel. Fig. 3 is a central section taken in the plane of the wheel of a portion of a pneumatic tire and rim of a wheel provided with my puncture-proof covering.

The same marks of reference indicate the same parts in the different figures of the drawings.

5 is some suitable flexible material, which may consist of canvas, rubber, rubber duck, or other similar material, but is best made of some elastic material.

6 is some suitable flexible material which is relied upon to protect the tire against puncture. This is best composed of a number of layers of woven fibrous material—such as cotton, canvas, linen, or the like—and is applied over the tread of the tire, being preferably fastened to the flexible material 5.

The materials 5 and 6 are made into sections circumferentially, and the ends of the adjoining section are fastened together by elastic strips 7, preferably of rubber, so as to take up any slack in the protective covering when the tire is in use. This elastic material may be inserted in the individual folds of the flexible material 6 and the material 5, as desired.

8 is the pneumatic rubber tire, and 9 the rim of the wheel. The protective covering is placed over the tread of the tire 8 and the edges of the elastic material 5, cemented or otherwise fastened in place between the tire and the rim 9. Other means of attaching the protective covering to the rim or tire may be employed without departing from my invention. A tire provided with such a protective covering always presents a smooth running-surface to the ground and therefore does not interfere with the running qualities of the wheel. The resiliency of a pneumatic tire provided with such a protective covering is substantially the same as when no protective covering is used. The strips of rubber by giving circumferential elasticity to the protective covering also prevent the protective covering from interfering with the elasticity or rebound of the tire, while the elastic material 5 imparts lateral or transverse elasticity to the tire, and the rebound of the tire is not interfered with by a covering which is inextensible laterally over the tire. It will be obvious that the same result as regards lateral elasticity or rebound may be imparted to the puncture-proof covering by elastic strips circumferentially inserted between the woven material 6.

Having fully set forth my invention, what I desire to claim and secure by Letters Patent of the United States is—

1. A puncture-proof covering for pneumatic tires made in sections, and having strips of elastic material joining the sections, substantially as and for the purpose set forth.

2. A puncture-proof covering for pneumatic tires, composed circumferentially of sections of layers of woven fibrous material arranged over the tread thereof, and having strips of rubber joining the sections, substantially as and for the purpose set forth.

3. A puncture-proof covering for pneumatic tires composed circumferentially of sections of layers of woven fibrous material arranged over the tread thereof and having strips of rubber joining the sections, with an elastic envelop therefor, whose edges are secured to the rim.

In testimony whereof I have hereunto set my hand and affixed my seal in the presence of the two subscribing witnesses.

CHARLES WALTER HAZELTINE. [L. S.]

Witnesses:
A. C. FOWLER,
JOHN F. GREEN.